United States Patent [19]

Cordaro et al.

[11] Patent Number: 5,094,693
[45] Date of Patent: Mar. 10, 1992

[54] DOPED ZINC OXIDE-BASED PIGMENT

[75] Inventors: James F. Cordaro, Alfred; Howard C. Rafla-Yuan, Alfred Station, both of N.Y.

[73] Assignee: International Lead Zinc Research Organization, Inc., Research Triangle Park, N.C.

[21] Appl. No.: 482,161

[22] Filed: Feb. 20, 1990

[51] Int. Cl.$^5$ ................................................ C09C 1/04
[52] U.S. Cl. .................................. 106/425; 423/622; 252/62.3 ZT; 106/426
[58] Field of Search ............... 106/425, 426; 423/622; 252/62.3 ZT

[56] References Cited

U.S. PATENT DOCUMENTS

| | | | |
|---|---|---|---|
| 3,346,409 | 10/1967 | Walrond | 106/425 |
| 3,515,686 | 6/1970 | Bowman | 106/425 |
| 3,538,022 | 11/1970 | Bowman | 106/425 |
| 4,574,003 | 3/1986 | Gerk | 501/12 |

FOREIGN PATENT DOCUMENTS 0163210  5/1921  United Kingdom ............... 106/425

*Primary Examiner*—Mark L. Bell
*Assistant Examiner*—Deborah Jones
*Attorney, Agent, or Firm*—Brumbaugh, Graves, Donohue & Raymond

[57] ABSTRACT

There is disclosed a doped zinc oxide pigment composition and method of preparing said composition, wherein the dopant is uniformly dispersed in the zinc oxide matrix in the form of a solid solution such that the mechanism by which undoped zinc oxide absorbs blue or near ultraviolet light is suppressed, thereby yielding a whiter composition. Preferred dopants are Al and Li.

27 Claims, No Drawings

DOPED ZINC OXIDE-BASED PIGMENT

BACKGROUND OF THE INVENTION

The present invention is directed to doped zinc oxide compositions and methods for preparing such compositions.

Zinc oxide is used as a paint pigment and as an additive in the manufacture of plastics. Since zinc oxide is used primarily as a white pigment, any substantial coloration, e.g. yellow, is normally undesirable and is to be avoided. Moreover, optical properties such as reflectivity, index of refraction and resistance to discoloration by radiation have particular importance in specific applications.

Even substantially pure zinc oxide has been known to demonstrate a noticeable yellow color. While the precise reason for this yellow coloration cannot be stated with certainty, there have been published theories which might explain the optical mechanism involved.

Research published in 1968 (W. E. Vehse, W. A. Sibley, F. J. Keller, and Y. Chen, *Phys. Rev.*, 167 [3] 828 (1968)) showed the presence of a 410 nm optical absorption band in zinc oxide and how this band was influenced by the incorporation of impurities and by irradiation of the zinc oxide using gamma and electrons. Research published in 1972 (D. R. Locker and J. M. Meese, *IEEE Trans. Nuc. Sci.*, NS-19, 237 (1972)) ascribed the structural identity of the 410 nm band to the possibility of an F+center (an oxygen vacancy with one trapped electron). Research published in 1988 (J. C. Simpson and J. F. Cordaro, *J. Appl. Phys.*, 63 [5] 1781 (1988)) showed the presence of a 0.3 eV deep level in the band gap of zinc oxide and ascribed this deep level to the F+ center of Locker and Meese. Simpson and Cordaro also suggested that the optical transition associated with the 410 nm band may be a charge transfer reaction from the valence band to the defect level.

This theory is based upon the premise that the optical absorption mechanism which is responsible for giving some zinc oxide pigments a yellow coloration is related to an F+center, or F+-like defect in the ZnO. Since the 410 nm absorption "band" is more like an absorption edge, the mechanism could likely involve the transfer of an electron from an extended state (band) to a localized state, rather than between localized states. The above premise does not, however, rule out that some species other than an F+center, such as a zinc interstitial, could be involved.

The electronic transition from an extended state to a localized state may be expressed by the following equation:

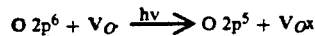

$$O\ 2p^6 + V_O \xrightarrow{h\nu} O\ 2p^5 + V_O{}^x$$

Consistent with the above theory, but not necessarily dependent upon it, it is an objective of the present invention to achieve zinc oxide compositions having enhanced optical properties. In particular, it is an objective of the present invention to employ dopants that will suppress the mechanism by which yellowing occurs, and thereby to obtain a whiter pigment. It is also an objective that the doped pigment have enhanced reflectivity, index of refraction and resistance to discoloration on exposure to radiation.

SUMMARY OF THE INVENTION

According to the present invention, it is contemplated that dopants be incorporated into the molecular matrix of zinc oxide in the form of a solid solution. By taking care to incorporate these dopants as a solid solution in the zinc oxide matrix, it has been possible to engineer the color of the zinc oxide product on an intermolecular and/or intra-molecular level, i.e., as opposed to merely adding pigments to achieve a surface effect.

Again, although the present inventors are not to be bound by the theory of their invention, the theory they espouse is nonetheless helpful in understanding the invention.

Thus, if the F+ center is indeed associated with the 0.3 eV deep level, oxygen vacancies in the ZnO matrix might give rise to the above-described electron transition reaction and result in a blue to near ultraviolet absorption and hence yellow coloration. This is particularly so if the Fermi level in the ZnO is low, for example near mid-gap between the valence band and the conduction band.

On the other hand, if the Fermi level of the ZnO can be raised (i.e., by the incorporation of a dopant) to a level nearer the bottom of the conduction band, the yellow coloration can be suppressed by suppression of the electron transition reaction.

A way to accomplish this is to increase the free electron density in the conduction band. Since ZnO is a II-VI compound semiconductor, the free electron density may be increased by the addition of elements which function as free electron donor-like dopants. It is theorized that an effect of raising the Fermi level is the creation of neutral oxygen vacancies or F centers. Therefore, by suitably doping the ZnO with selected elements, the yellow coloration of the ZnO may be suppressed.

We also theorize that there may be another mechanism by which the yellow coloration may be suppressed. In order to function as a donor-like dopant, the impurities as they enter the ZnO lattice preferably are oxygen-rich compared to ZnO. The addition of an oxygen-rich dopant suppresses the formation of oxygen vacancies during processing, thereby making the zinc oxide more stoichiometric. More stoichiometric ZnO will show less yellow coloration than ZnO which is less stoichiometric.

While certain substitutional and interstitial elements are considered to be suitable candidates, it should be understood that other elements may also prove advantageous. What is of primary importance is that the dopant be incorporated such that it actually penetrates and, to the extent possible or practical, forms a solid solution with the ZnO matrix. By taking care to introduce the dopant in such a manner, the ZnO itself is engineered on an inter or intramolecular level so as to suppress the mechanism by which undesirable coloration occurs.

Suitable candidate dopants are as follows:

| (a) Substitutional Impurities for Zinc Cations (all trivalent): | | | |
|---|---|---|---|
| Group IIIB Elements | B | Al | Ga | In
| Group IIIA Elements | Sc | Y | La |
| (b) Possible interstitial Impurities (all monovalent): | | | |
| Group IA Elements | H | Li | Na | K Dopants must not impart color to the ZnO, hence typical transition elements must be avoided. Synergistic effects might be observed if both substitutional and interstitial impurities, such as Al and interstitial Li, are incorporated simultaneously.

DESCRIPTION OF THE PREFERRED EMBODIMENTS

There are two aspects to the preferred embodiments, (a) the selection of the particular dopant and (b) the method by which the dopant is added to the ZnO. Both are important, and either might result in a satisfactory versus an unsatisfactory product.

With respect to dopant selection, both $Al_2O_3$ and $Li_2O$ have been found to be effective dopants. The dopants are to be added in relatively small amounts (as compared to ZnO) both because it is easier to achieve the necessary uniform dispersion (preferably solid solution) of the dopant in the ZnO, and because it appears that the effect of the dopant maximizes at a relatively low concentration, e.g., at about 1 mol % Al.

While the concentration of dopant in the ZnO may vary, it has been found that very small concentrations (e.g. 0.008 mol % Al) have an apparent effect. Also while dopant concentrations of up to 4.3 mol %, i.e. of Al, have been successfully tested, as noted above it appears that the dopant effect saturates at about 1 mol %. It is therefore contemplated that the dopant be present in the lowest functional amount up to about 10 mol %, and preferably in a concentration from about 0.001 mol % to about 10 mol %. More specifically, a concentration of from 0.005 to about 2 mol % should prove adequate.

The method by which the dopant may be incorporated into the ZnO to achieve the desired uniform dispersion/dissolution is somewhat complex. As a first and readily apparent factor, rather strict quality controls, both with respect to starting material purity and contaminant avoidance during processing, are important.

As to specific approaches, four have been investigated: (1) coating with aluminum sec-butoxide sol-gel, (2) direct coating with aluminum hydroxide, (3) thermal decomposition of aluminum and zinc nitrates, and (4) coating with aluminum acetylacetonate. The last of these is so-far preferred, as can be seen from the following examples:

EXAMPLE 1 - Aluminum Sec-Butoxide Sol-Gel - Coating

A sol-gel coating technique, for the zinc oxide powder particles, utilizing aluminum sec-butoxide, $Al(OC_3H_9)_3$, was investigated. Aluminum sec-butoxide is first made to dissolve in anhydrous sec-butanol or other organic solvent. Following this step, the ZnO powder is dispersed in the solution. Afterwards, the aluminum is made to undergo a reaction to form a sol-gel which then coats the ZnO particles. The reaction to form the sol-gel consists of the following: (a) hydrolysis of the aluminum sec-butoxide upon the addition of an appropriate amount of water to the mixture.

$$Al(OC_4H_9)_3 + 2H_2O \rightarrow AlO(OH) + 3C_4H_9(OH)$$

(b) acid catalyzed dehydration and polycondensation of the aluminum hydroxide.

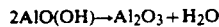

$$2AlO(OH) \rightarrow Al_2O_3 + H_2O$$

In this procedure, the aluminum sec-butoxide proved to react much too vigorously with moisture in the air and also to be very rapidly oxidized by oxygen in the air. These problems make this approach for synthesizing powders according to the invention difficult if not impractical.

EXAMPLE 2 - Direct Coating with Aluminum Hydroxide

The use of directly peptized Boehmite gel, AlO(OH), was also investigated as a method for coating the ZnO. Both ZnO and AlO(OH) compounds were dispersed in water using an ultrasonic dispersion probe. This was followed by the addition of a small amount of nitric acid. The nitric acid was added to reduct the pH of the mixture to 2 to catalyze the dehydration and polycondensation of the aluminum hydroxide. The mixture was then dried on a hot plate with continuous stirring. After drying, the powder was calcined at 650° C. overnight so as to diffuse the Al into the ZnO as a solid solution.

Since the AlO(OH) does not truly go into solution in water (or organic solvents), it is difficult to obtain a uniform coating using this method. The uniformity depends in large part upon the degree to which the AlO(OH) can be dispersed with the ultrasonic probe. The uniformity of the coating further affects the extent to which the coating can be dispersed into the ZnO matrix by calcining.

EXAMPLE 3 - Thermal Decomposition of Aluminum and Zinc Nitrates

A very simple method of forming an intimate mixture of zinc oxide and aluminum oxide is by the thermal decomposition of zinc and aluminum nitrates in oxygen. Thermogravimetric analysis (TGA) of weight loss during heating shows that pure zinc nitrate hydrate, $Zn(NO_3)_2 \cdot 6H_2O$, begins to thermally decompose at approximately 90° C. The decomposition to ZnO is essentially complete after approximately 400° C. Decomposed zinc nitrate hydrate powder, which has been calcined in air at 1000° C. for twelve hours, was confirmed to be zinc oxide (zincite) by using x-ray powder diffraction techniques.

In order to synthesize a solid solution of zinc and aluminum oxides, an appropriate amount of aluminum nitrate hydrate, $Al(NO_3)_3 \cdot 9H_2O$, is first dissolved into an aqueous solution with zinc nitrate hydrate. The solution of the nitrates is then dried to a powder. An intimate mixture of zinc oxide and aluminum oxide will result upon the thermal decomposition of the powder in an oxygen atmosphere.

TGA of the pure aluminum nitrate hydrate shows that decomposition of this chemical is essentially complete after 400° C. Provided that the amount of aluminum in the starting aqueous solution is small, less than a few mol %, there should be little segregation of the aluminum from the zinc upon heating.

This chemical preparation procedure works well in many respects; however, when the zinc nitrate decomposes at approximately 350° C., the powder may acquire a yellow coloration. This is presumably due to the incorporation of red-brown nitrogen dioxide gas into the material. Even after calcining at 1000° C. in air for 12 hours, the coloration does not completely disappear. The addition of 5 mol % Al to the zinc nitrate solution only slightly suppressed the coloration. Because of the coloration remaining in all powders produced using this technique, this method is not preferred.

EXAMPLE 4 - Aluminum Acetylacetonate

The metal organic compound aluminum acetylacetonate, $Al(C_5H_7O_2)_3$, was obtained in 99% purity from Aldrich Chemical Co., Milwaukee, Wis., United States. A procedure was developed to use this in the form of a coating for zinc oxide powder particles. The coating procedure was followed by a high temperature calcination to diffuse the aluminum into solid solution with the zinc oxide. The step by step experimental procedure is as follows:

1. A known weight of aluminum acetylacetonate (a solid) is dissolved in high pressure liquid chromatography grade (HPLC) reagent ethanol alcohol.

2. An appropriate corresponding amount by weight of zinc oxide powder is dispersed in the solution using an ultrasonic dispersion probe. The combined aluminum acetylacetonate solution and zinc oxide particle suspension can be used to form (by mole %) a 0.5 Al-99.5 ZnO composition powder in a typical experiment.

3. The alcohol mixture is then immediately evaporated using a hot plate with constant stirring of the mixture. The aluminum acetylacetonate should be uniformly ispersed throughout the zinc oxide.

4. The dried mixture is calcined to form the final powder by heating at 650° C. overnight. The purpose of this step is to:

a. Decompose the aluminum acetylacetonate to form aluminum oxide and remove all remaining organics by oxidizing them to form carbon dioxide and water vapor.

b. Diffuse the aluminum into the zinc oxide particles to form a solid solution which will have the desired optical properties.

A 0.5 mol % Al - ZnO powder was prepared by this method and chemically analyzed. Chemical analysis of the powder showed no aluminum loss occurred during the procedure. The Al - ZnO powder was visibly whiter than a pure ZnO powder prepared under the same procedure without aluminum.

Several transmission electron microscopy (TEM) studies of the prepared materials were performed both before and after calcining. This was done to investigate: (A) the coating behvaior of the aluminum compounds; (b) the uniformity of doping and; (c) the particle sizes of the aluminum containing compounds after processing.

Tests showed that in certain instances before calcining, some ZnO particles were coated, while others were not. Many of the crystals of aluminum acetylacetonate tended to be larger than the zinc oxide powder particles which suggests some problems with uniformity of doping might remain, even though the above procedure, in practice with low aluminum concentrations, appears to work well.

EXAMPLE 5 - Aluminum Acetvlacetonate

An example is given for producing a 1.0 mol % Al doped ZnO powder:

1. Dissolve 0.001 mole (0.324 g) of aluminum acetylacetonate $Al(C_5H_7O_2)_3$ into 100 ml of methanol in a Pyrex beaker.

2. Weigh out 0.1 mole (8.138 g) of ZnO powder (Fisher Scientific, Reagent Grade).

3. Disperse in the above solution using an ultrasonic dispersion probe.

4. Prepare 1 molar ammonium hydroxide $NH_4OH$ aqueous solution. The pH of the $NH_4OH$ solution is approximately 12.

5. The $NH_4OH$ solution is then added into the $Al(C_5H_7O_2)_3$ and ZnO mixture, such that the pH of the slurry is approximately 8.

The drying and calcining procedure is as follows:

1. Dry slurry on a stirring hotplate at approximately 180° C. with constant stirring.
2. Place resulting powder in a 99.8% alumina ceramic crucible.
3. Heat from room temperature to 500° C. in air at 2° C. per min.
4. Hold at 500° C. for 2 hours.
5. Heat from 500° C. to 900° C. at 5° C. per min.
6. Hold at 900° C. in air for 10 hours.
7. Cool from 900° C. to room temperature at approximately 5° C. per min.

EXAMPLE 6 - Aluminum Acetylacetonate

Al doped powders were made from nominally 0.05 mol % Al up to 6.0 mol %. The end members of the chemically analyzed powders were actually from 0.008 up to 4.26 mol % Al. The effects upon the whiteness of the powder becomes immediately apparent with the smallest concentration of Al, however the Fermi energy appears to saturate by this technique at about 1 mol % Al.

Calcining temperatures ranged from 900° up to 1250° C. With higher temperatures, the powders became more yellow in coloration. Thus, lower calcining temperatures are preferred.

EXAMPLE 7 - Oxidation of Zinc Vapor

It is contemplated that commercial quantities of doped zinc oxide according to the invention can be produced by a variation of the so-called French process of producing zinc oxide. In the French process, metallic zinc is heated to the boiling point so as to evolve zinc vapor. The vapor is then burned in oxygen so as to form substantially pure zinc oxide particles (typically in the form of smoke) which are then collected by known means, e.g. by separators, baffles and/or filtration.

It is expected that the French process can be utilized to produce doped zinc oxide by adding the dopant, e.g. Al, to the molten zinc bath such that the dopant is also vaporized in the desired concentration. The dopant may then be oxidized with the zinc vapor so as to yield the appropriate zinc/dopant oxide mixture.

From the above, it will be appreciated that the present invention involves a unique approach whereby a ceramic pigment has been deliberately engineered, on the molecular level, by alloying with a semiconductor dopant to enhance the basic optical properties of the material.

It also represents a novel use of a dopant for ZnO pigment to eliminate coloration due to native defects acting as color centers. A bright white ZnO pigment has been produced. The doped pigment shows a more uniform optical absorption over the visible spectrum than does an undoped control specimen processed in a similar manner.

The doped pigments may be expected to show an enhanced resistance to radiation induced degradation and discoloration over undoped pigments. Discoloration due to radiation which can create color centers in ZnO is expected to be lower. Such radiation includes proton, electron, neutron, and possibly ultraviolet and gamma.

In this regard, the Fermi level of the doped pigment lies above the 0.3 eV defect level, effectively suppressing the electronic transition responsible for the optical absorption and yellow coloration. The creation of additional similar color centers by radiation, which can cause atomic displacement, will thus form color centers which are optically inactive. These optically inactive defects will not contribute to the coloration of the material unless the free electron density decreases, such that the Fermi level in the ZnO is reduced. If this happens, the defects will become optically active and contribute a yellow coloration. The Fermi level in the ZnO can decrease by the radiation-induced formation of acceptor-like centers, such as zinc vacancies.

Finally, the index of refraction could be expected to be greater in the doped pigments than in the undoped pigments due to an increase in the free electron density and electronic conductivity of the particles. An increase in index of refraction enhances the covering power of ZnO as a paint pigment and encourages use of the material as a titania diluent in commercial paints.

Because the present invention is intended to take advantage of the improved color characteristics of zinc oxide, it will be appreciated that the primary intended use is as a paint constituent or additive—e.g. doped zinc oxide together with a suitable liquid carrier, or doped zinc oxide as a whiteness enhancer in a titanium-based or other type of paint. The doped zinc oxide may also find use as an additive to plastics or other compositions so as to improve the color or radiation-resistant properties of the plastic (or other composition) product. The doped zinc oxide could also be used as a component in a ceramic glaze.

Thus, within the scope of the present invention are paints and other products which contain doped zinc oxide for its whiteness or radiation-resistance enhancing qualities. For example, the radiation-resistant qualities of certain paints, e.g. spacecraft coatings or the like, could be enhanced.

Also, paint compositions which, except for the doped zinc oxide composition according to the present invention, may be otherwise known, are within the scope of the present invention. Included, therefore, are paints having interior and exterior latex-based vehicles, as well as silicate-based vehicle paints (including primers). So long as the paint product contains the doped zinc oxide pigment according to the present invention, it is considered to be novel and to represent a significant improvement over paint products which do not contain such a pigment.

We claim:

1. A substantially pure white doped zinc oxide pigment composition, said composition comprising a matrix of substantially pure zinc oxide and a dopant, said dopant containing at least one of the elements selected from the gorup B, Al, Ga, In, Sc, Y, La, H, Li, Na and K, and being distributed throughout the zinc oxide so as to form a substantially homogeneous alloy, said dopant being present in an amount sufficient to render said composition substantially resistant to radiation-induced discoloration.

2. A doped zinc oxide pigment composition according to claim 1 wherein the concentration of said dopant is from about 0.001 mol % to about 10 mol %.

3. A doped zinc oxide pigment composition according to claim 2 wherein the dopant is present in the zinc oxide in the form of a solid solution.

4. A doped zinc oxide pigment composition according to claim 1 wherein the dopant functions to supprses the formation of oxygen vacancies or zinc interstitials in the zinc oxide, thereby rendering the zinc oxide more stoichiometric and less yellow than substantially pure zinc oxide without said dopant.

5. A doped zinc oxide pigment composition according to claim 1 wherein the dopant functions as a free electron donor.

6. A doped zinc oxide pigment composition according to claim 1 wherein the dopant is aluminum.

7. A doped zinc oxide pigment composition according to claim 1 wherein the dopant is Li.

8. A doped zinc oxide pigment composition according to claim 1 wherein the dopant is In.

9. A substantially pure white doped zinc oxide pigment composition, said composition comprising a matrix of substantially pure zinc oxide and from about 0.001 mol % to about 10 mol % of dopant, said dopant containing at least one of the elements selected from the group B, Al, Ga, In, Sc, Y, La, H, Li, Na and K, and being present in an amount sufficient to suppress the formation of oxygen vacancies or zinc interstitials in the zinc oxide, thereby rendering the zinc oxide more stoichiometric and resistant to radiation induced yellowing.

10. A substantially pure white doped zinc oxide pigment composition, said composition comprising a matrix of substantially pure zinc oxide and from about 0.001 mol % to about 10 mol % of dopant, said dopant containing at least one of the elements selected from the group B, Al, Ga, In, Sc, Y, La, H, Li, Na and K, and being present in an amount sufficient to raise the Fermi level of the composition beyond that of undoped zinc oxide, thereby suppressing electron ransitions which cause the zinc oxide to absorb blue or near ultraviolet light and thereby appear yellow.

11. In a ceramic glaze composition containing a pigment, the improvement wherein the pigment is the doped zinc oxide pigment composition according to claim 1.

12. In a liquid paint composition comprising a liquid pain vehicle and a pigment, the improvement wherein the pigment is the doped zinc oxide pigment composition according to claim 1.

13. The liquid paint composition according to claim 12 wherein said liquid paint vehicle includes an interior or exterior latex-based vehicle.

14. The liquid paint composition according to claim 12 wherein said liquid paint vehicle includes an silicate-based vehicle.

15. In a paint composition comprising a liquid paint vehicle and a pigment, the improvement wherein the pigment is the doped zinc oxide pigment composition according to claim 9.

16. The paint composition according to claim 15 wherein said liquid paint vehicle includes an interior or exterior latex-based vehicle.

17. The paint composition according to claim 15 wherein said liquid paint vehicle includes a silicate-based vehicle.

18. In a paint composition comprising a liquid paint vehicle and a pigment, the improvement wherein the pigment is the doped zinc oxide pigment composition according to claim 10.

19. The paint composition according to claim 18 wherien said liquid paint vehicle includes an interior or exterior latex-based vehicle.

20. The paint composition according to claim 18 wherein said liquid paint vehicle includes a silicate-based vehicle.

21. A method of preparing a substantially pure white doped zinc oxide pigment composition comprising the steps of dissolving from about 0.001 mol % to about 10 mol %, relative to the mole % of zinc oxide to be added, of a dopant in a solvent, said dopant containing at least one of the elements selected from the group B, Al, Ga, In, Sc, Y, La, H, Li, Na and K, and;

dispersing from about 99.999 mol % to about 90 mol % zinc oxide in said solvent so as to form a slurry;
   drying said slurry so as to drive off substantially all of said solvent; and
   calcining said dried composition to (a) drive off substantially all carbon and hydrogen which may be present in said dopant and (b) to diffuse the dopant into the zinc oxide thereby obtaining a substantially pure white doped zinc oxide with said dopant present therein in solid solution, said doped zinc oxide being substantially resistant to radiation induced discoloration.

22. A method of preparing a doped zinc oxide pigment composition according to claim 21 wherein the dopant is capable of functioning as a free electron donor such that said composition is less yellow than substantially pure zinc oxide without said dopant.

23. A method of preparing a doped zinc oxide pigment composition according to cliam 21 wherein the dopant is aluminum.

24. A method of preparing a substantially pure white doped zinc oxide pigment composition according to claim 21 including the steps of dissolving aluminum acetylacetonate in an alcohol solvent so as to form a solution;

uniformly dispersing zinc oxide in said solution to form a slurry;
   drying the slurry so as to form a powder;
   calcining the powder at at least 650° C. for a period of at least 8 hours;
   thereby forming doped zinc oxide pigment composition having from about 0.001 mol % to about 10 mol % aluminum in solid solution as a dopant, said doped zinc oxide being substantially resistant to radiation induced discoloration.

25. A method of preparing a doped zinc oxide pigment composition according to claim 21 including the step of adjusting the pH of the slurry to at least pH 8 prior to drying and calcining.

26. A method of preparing a doped zinc oxide pigment composition according to claim 21 wherein the pH is adjusted by the addition of $NH_4OH$.

27. A method of preparing a substantially pure white doped zinc oxide pigment compositino including the steps of heating metallic zinc and a dopant to a temperature sufficient to cause zinc and dopant vapor to be formed, said dopant containing at least one of the elements selected frqm the group B, Al, Ga, In, Sc, Y, La, Li, Na and K, contacting the zinc and dopant vapor with oxygen so as to burn said vapor and form a mixture of zinc oxide and an oxide of the dopant,
   and collecting said mixture as solid particles, said solid particles being substantially resistant to radiation induced discoloration.

* * * * *